United States Patent Office.

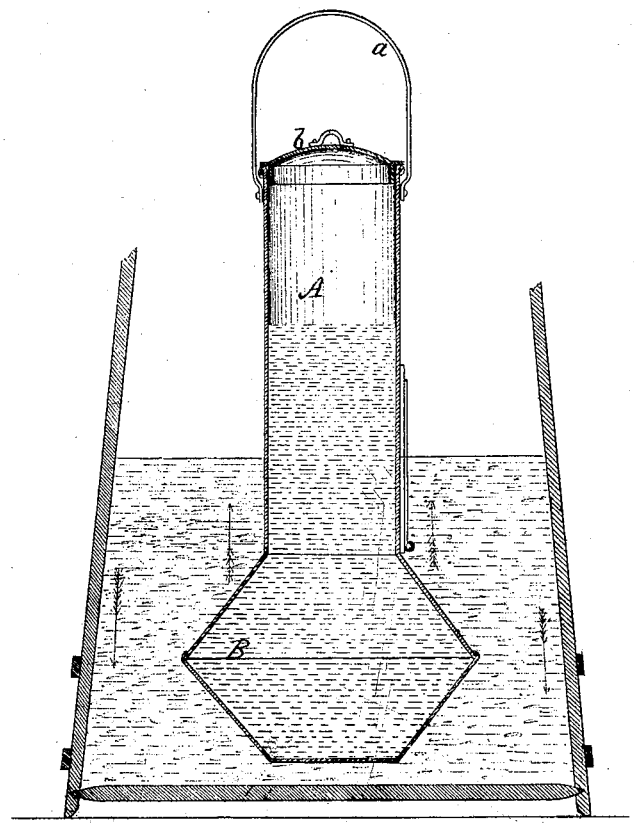

JAMES C. BEDDOE AND JOHN S. COON, OF BRANCHPORT, NEW YORK.

Letters Patent No. 101,086, dated March 22, 1870.

IMPROVEMENT IN CREAM-HEATER.

The Schedule referred to in these Letters Patent and making part of the same.

*To all whom it may concern:*

Be it known that we, JAMES C. BEDDOE and JOHN S. COON, both of Branchport, in the county of Yates and State of New York, have invented a certain new and useful Improvement in Cream-Heaters; and we do hereby declare that the following is a full and exact specification thereof.

Nature of the Invention.

This invention consists of a tubular vessel with preferably an enlarged bottom, which vessel is inserted in the churn, cream-pot, or other vessel for heating the cream, as herein described.

General Description.

The drawing represents a central vertical section of our heater placed in a churn for heating the cream.

The upper portion of the heater is simply a tube, A, round or otherwise, preferably about fifteen inches long and three and a half in diameter, and having at the top a bail, $a$, by which it is handled, and a cover, $b$, through which water is admitted to the vessel.

The lower portion consists of an enlarged chamber, B, preferably of the flaring form shown, to facilitate the upward action of the cream in a heated state, and being six inches, more or less, in diameter.

This vessel, being filled with hot water, is inserted in the churn, pot, or other vessel containing the cream, which is heated thereby to the proper degree, about 65°, when it is removed, and the cream is then ready for churning.

The advantage of the construction lies essentially in the form, the tubular part allowing an easy insertion in the vessel, and at the same time holding a column of hot water the whole height of the cream, while the enlarged bottom occupies a greater lateral space, not only to fill the flaring form of the churn but also to give an impetus to the heating effect at that point, which is essential to compensate for the rapid rising of the heated cream to the top. This form of the device produces the desired equilibrium of the temperature of the cream.

It is quite as effective in hot weather in reducing the temperature of the cream by inserting cold instead of hot water.

If desired, a thermometer may be attached to the heater, to indicate the temperature of the cream. In such case it might be best to insulate or remove it from contact, as much as possible, from the sides of the heater, to prevent receiving heat therefrom.

Claim.

What we claim is—

A cream-heater or cooler in which an enlarged bottom, B, is combined with a tubular body, A, in the manner and for the purpose specified.

In witness whereof we have hereunto signed our names in the presence of two subscribing witnesses,

JAMES C. BEDDOE.
JOHN S. COON.

Witnesses:
R. F. OSGOOD,
GEO. W. MIATT.